B. GARLLUS.
NETTING LOOM.
APPLICATION FILED JUNE 12, 1915.
1,186,474.
Patented June 6, 1916.
7 SHEETS—SHEET 6.
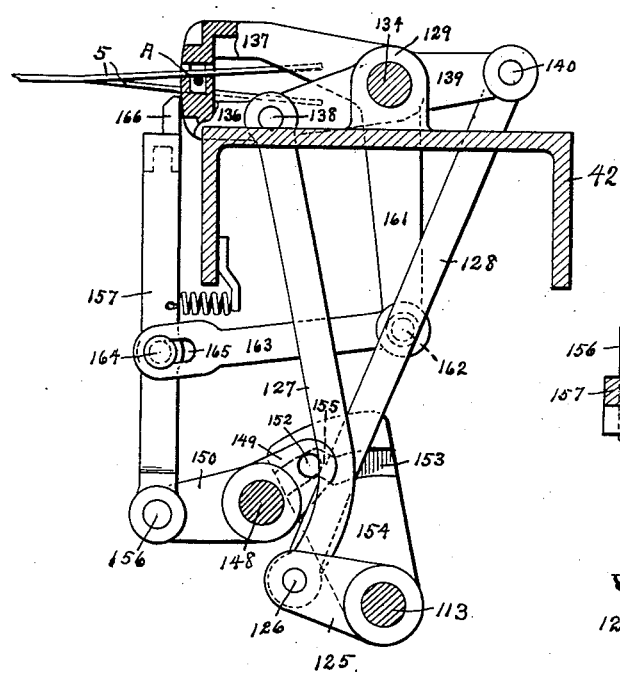
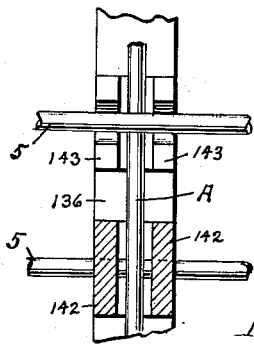
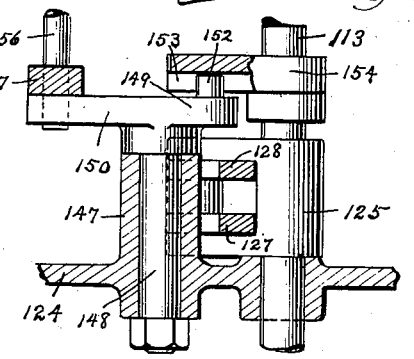
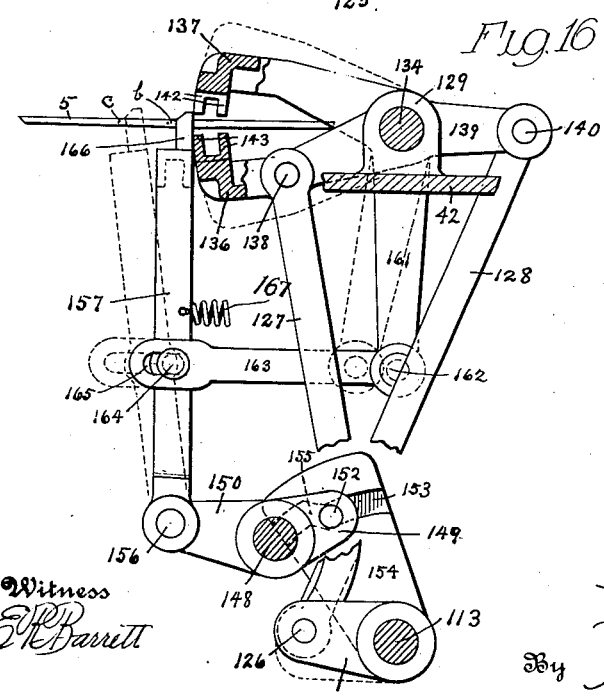
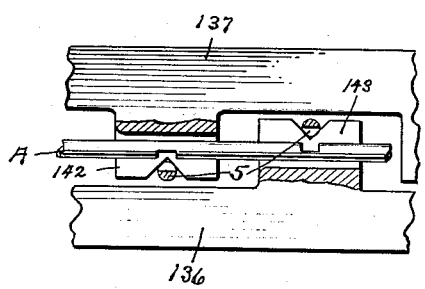
Witness
E. R. Barrett
Inventor
Bernt Garllus.
By Pagelsen and Spencer,
Attorneys

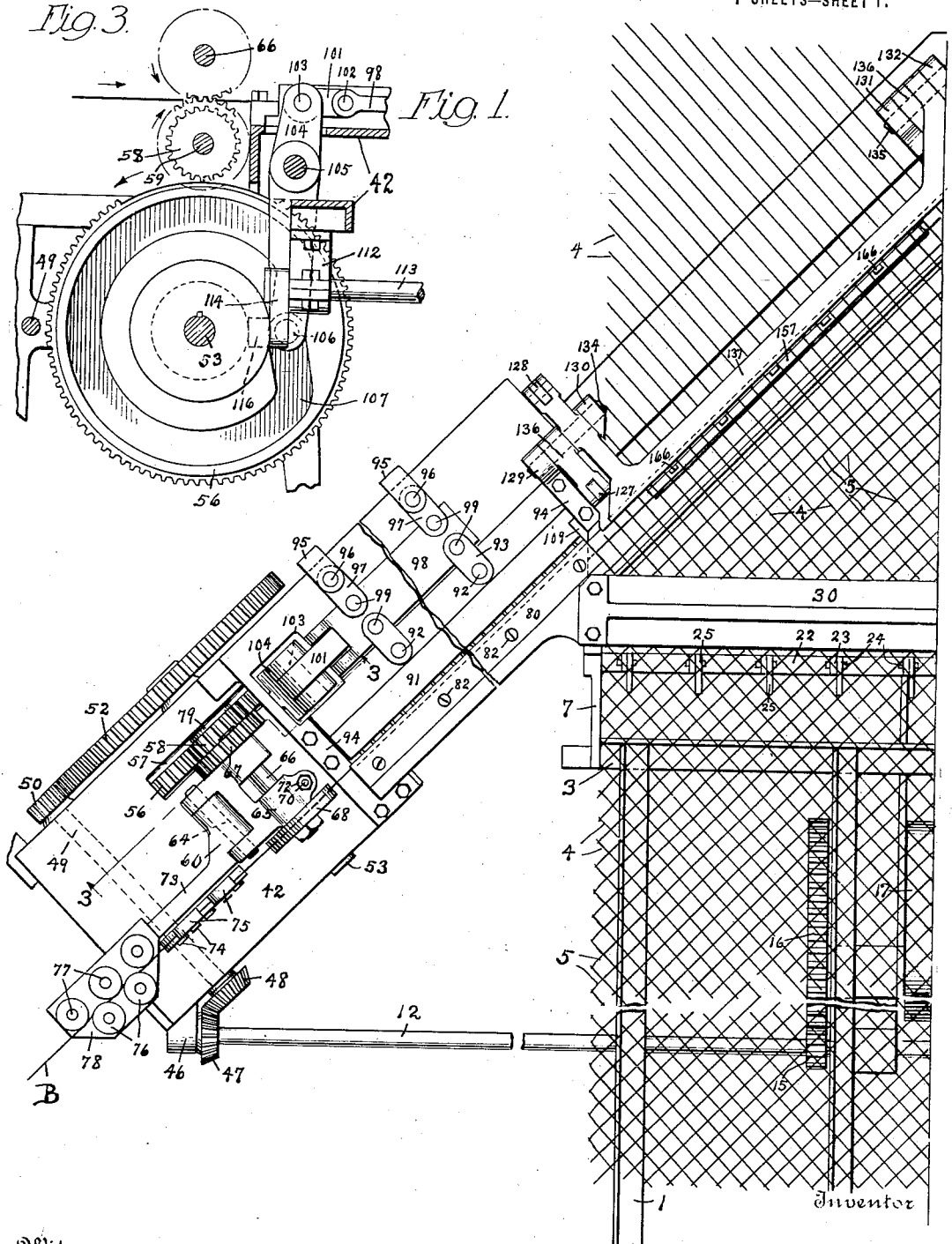

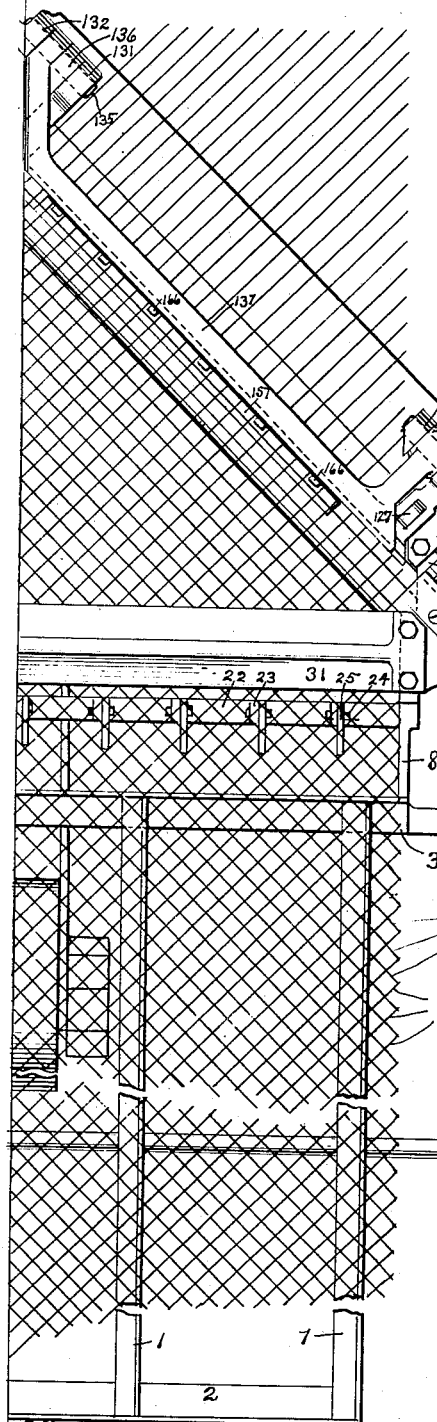
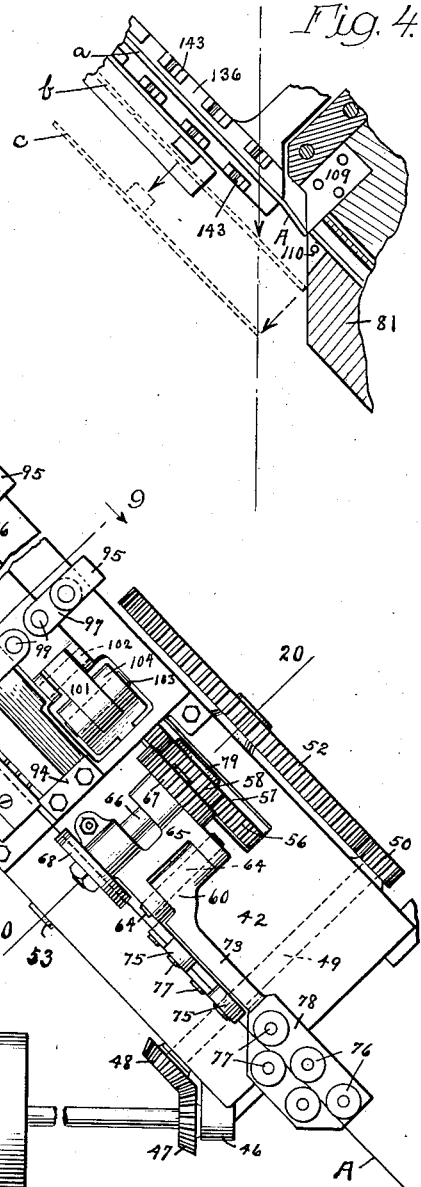

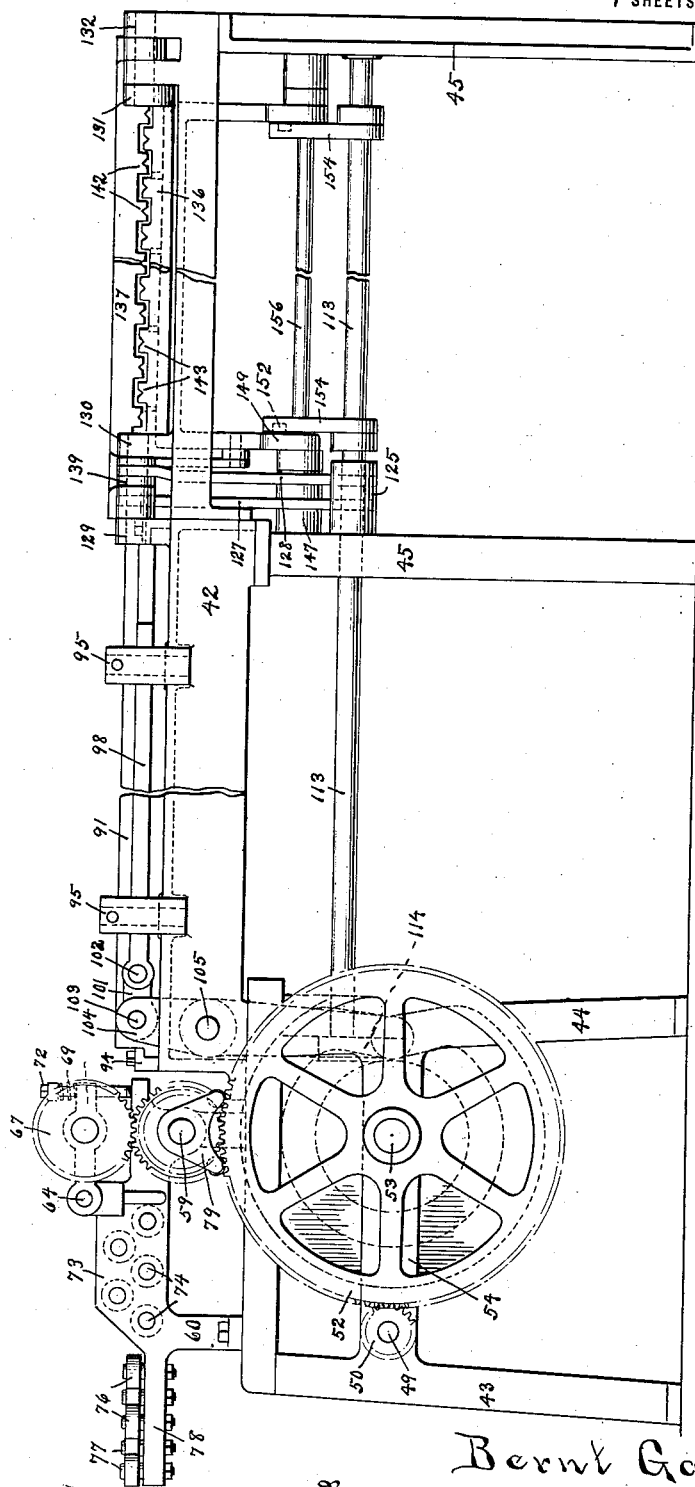

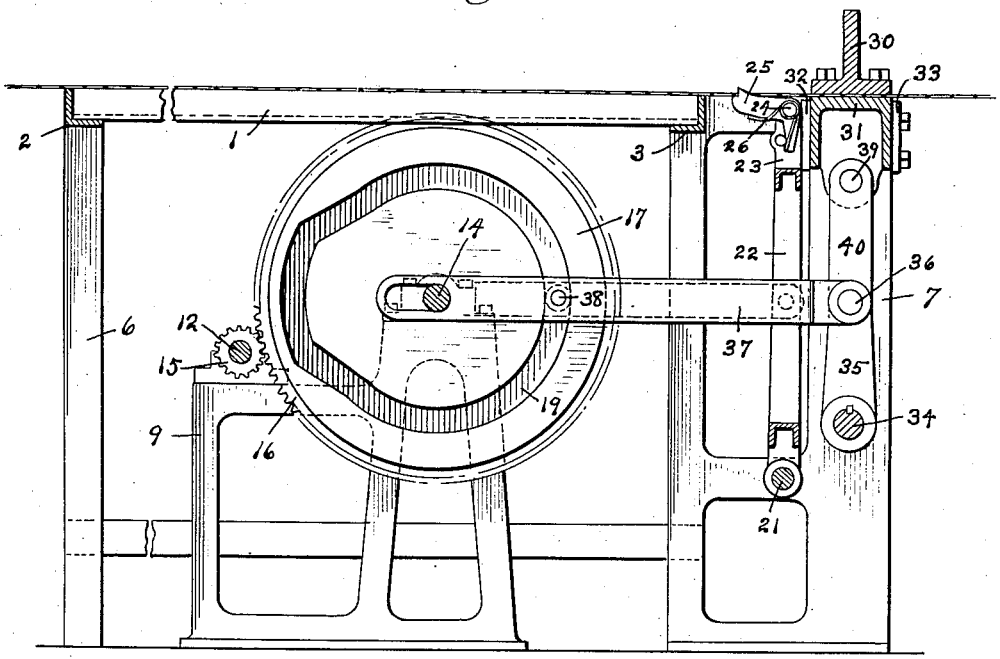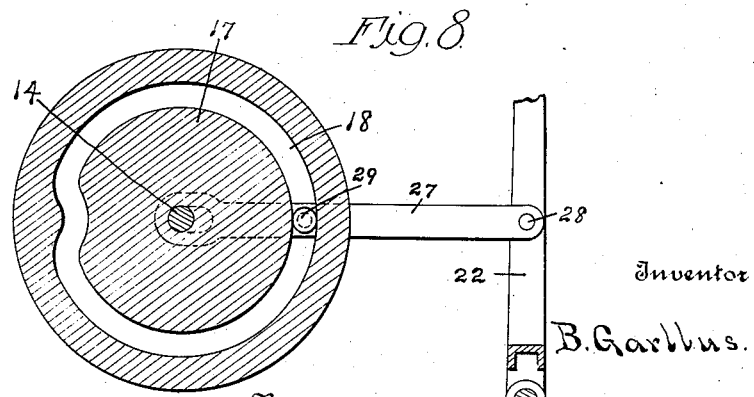

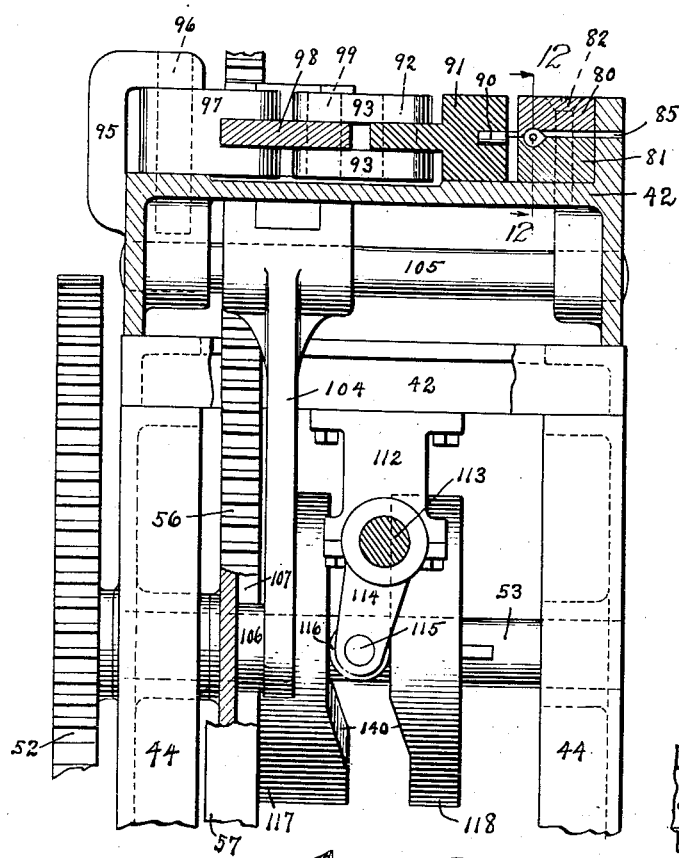
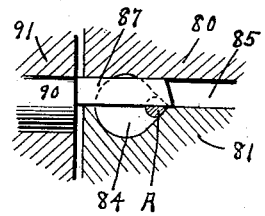
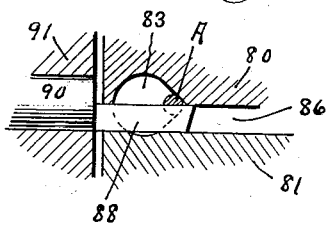
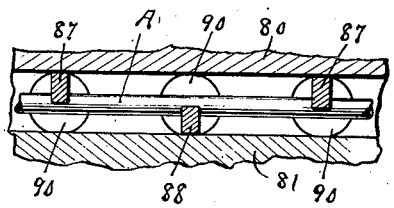
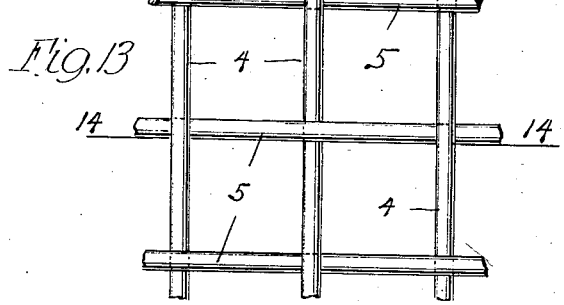

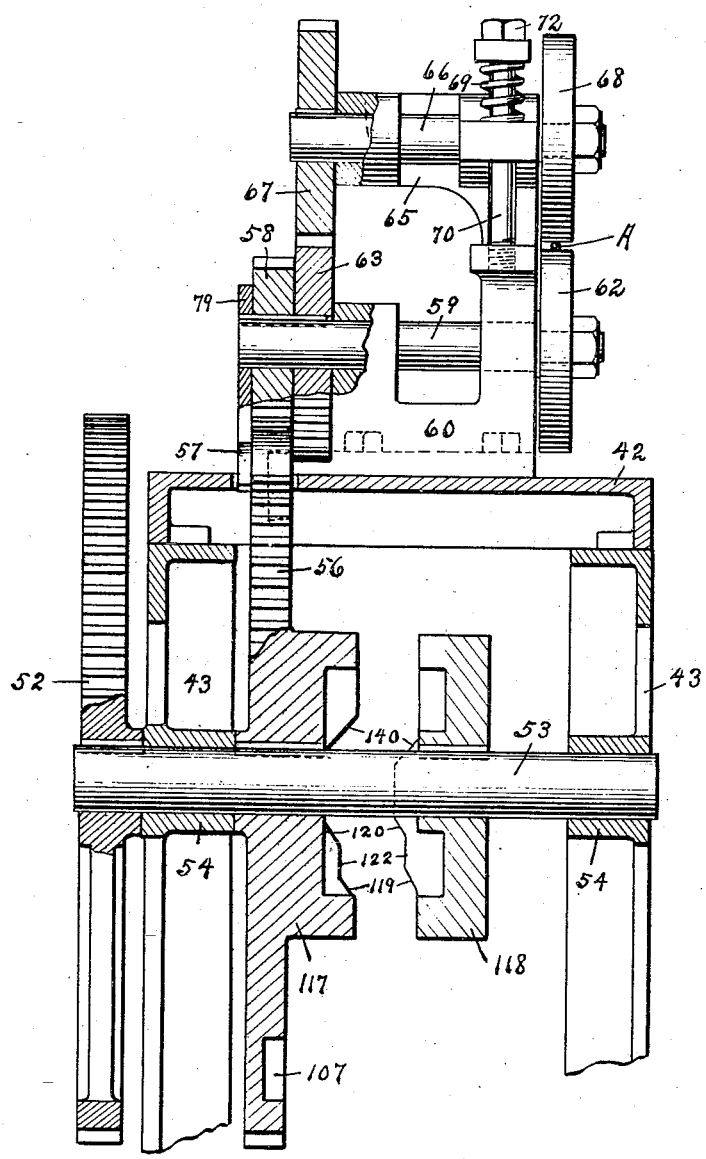

UNITED STATES PATENT OFFICE.

BERNT GARLLUS, OF DETROIT, MICHIGAN, ASSIGNOR, BY MESNE ASSIGNMENTS, TO N. E. S. MANUFACTURING COMPANY, OF DETROIT, MICHIGAN, A CORPORATION OF MICHIGAN.

NETTING-LOOM.

1,186,474.  Specification of Letters Patent.  Patented June 6, 1916.

Application filed June 12, 1915. Serial No. 33,647.

*To all whom it may concern:*

Be it known that I, BERNT GARLLUS, a citizen of the United States, residing at Detroit, in the county of Wayne and State of Michigan, have invented a new and useful Netting-Loom, of which the following is a specification.

This invention relates to machines for weaving stiff and comparatively heavy metal rods into netting, and its object is to provide a loom which shall be simple in construction, which shall not be liable to get out of order and which shall have a large output of finished material.

This invention consists, in combination with the supporting frame, of a netting loom, of means for moving the finished netting step by step along on the frame, of a novel notching mechanism at each side of the frame to cut transverse notches in opposite sides of two rods at the points where they will contact with other rods when woven into the netting, of novel means for longitudinally feeding the two notched rods at an angle to each other and parallel to other rods already in place and constituting the finished netting, while such rods are held up and down to permit the entrance of the longitudinally moving rods, a shear for each rod, together with devices for moving the last inserted rods laterally until they enter the notches of the previously positioned rods which in turn enter the notches of the last inserted rods.

In the accompanying drawings, Figures 1 and 2 constitute a complete plan of this netting loom. Fig. 3 is a section on the line 3—3 of Fig. 1. Fig. 4 is a plan of a shear. Fig. 5 is a side view of the rod feeding, notching and bending devices. Fig. 6 is an elevation of the devices for gripping and feeding the finished fabric. Fig. 7 is a plan thereof with the main cam in horizontal section. Fig. 8 is a diagrammatic view of the feeding cam. Fig. 9 is a section on the line 9—9 of Fig. 2 on a larger scale. Figs. 10 and 11 are transverse sections of a rod guide showing notching cutters in operative relation to a rod. Fig. 12 is a section on the line 12—12 of Fig. 9 on a larger scale. Fig. 13 is a plan of the netting produced on this machine. Fig. 14 is a section thereof on the line 14—14 of Fig. 13. Fig. 15 is an elevation of a device for moving one of the rods laterally and a section of a spreader. Fig. 16 is a similar view with the positions of the parts slightly changed. Fig. 17 is a plan of a section of a spreader. Fig. 18 is a detail of the cam and crank for operating the spreader and feeder. Fig. 19 is an elevation of a section of the spreader. Fig. 20 is a section on the line 20—20 of Fig. 2.

Similar reference characters refer to like parts throughout the several views.

This netting loom is made up of the main frame and the means for holding and feeding the finished fabric; of means for feeding and straightening the rods; means for notching and shearing the rods; means for spreading the already positioned rods to permit the introduction of the new rods and means for sliding the new rods along to proper location between the already positioned rods.

*The means for holding and feeding the fabric.*—The main frame of this loom may be of any desired material and construction. In the drawings, Figs. 1, 2 and 6, the upper longitudinal bars 1 are shown supporting the netting which consists of notched diagonal rods 4 and 5, preferably meeting at right angles and evenly spaced. These bars 1 are supported at their ends on the angle bars 2 and 3, the former carried by posts 6 and the latter by two upright frames 7 and 8. See Figs. 1, 2 and 6. Beneath the bars 1 are two frames 9 and 10, the former carrying a bearing for the main shaft 12 which may be driven in any desired manner, a pulley 13 being shown. On the main shaft is secured a pinion 15 that meshes with the gear 16 on the cam shaft 14, carried by the frames 9 and 10. A double cam 17 having grooves 18 and 19, is also secured to the cam shaft.

A shaft 21 extends across between the frames 7 and 8 and carries a swinging rectangular frame 22, from which a series of flat pins 23 project upwardly. On each of these pins is a pivot 24 which carries a dog 25 whose tooth is normally forced upwardly by the spring 26. A link 27 (Fig. 8) connects to the pin 28 carried by the rectangular frame, and projecting from this link into the cam-groove 18 is a pin 29. The end of the link is slotted to receive the shaft 14 on which the link is supported. It will be seen that the rectangular frame 22 will be quickly swung forward and back once at each revolution of the cam shaft and that, by means of the dogs 25, the finished netting will be moved a distance equal to the diagonal dimension of a mesh of the netting at each revolution of the cam shaft.

Extending across between the frames 7 and 8 and secured thereto is a beam 30. A presser plate 31 is slidable vertically between guides 32 and 33 carried by the frames 7 and 8 by means of mechanism consisting of a shaft 34 mounted in the frames 7 and 8, a crank 35 connected to the shaft and having a pin 36 at its upper end, a connecting rod 37 connected to this pin and having a slot at its opposite end through which the shaft 14 extends, a pin 38 carried by the rod 37 and extending into the cam-groove 19, and a pin 39 carried by the presser plate 31 to which the toggle link 40 connects, which link also connects to the crank pin 36. At each revolution of the cam shaft, therefore, the presser plate 31 is lowered slightly and while in such lowered position, the netting is moved forward by the dogs 25, after which the presser plate is again elevated to grip the netting.

*Feeding and straightening means.*—Referring now to Figs. 1, 2, 5 and 20, an auxiliary bed-plate 42 will be seen secured to each side of the main frame and at an angle thereto, connecting particularly to the upright frames 7 and 8. Pairs of legs 43, 44 and 45 support these bed-plates, and a bearing 46 is formed on each inner leg 43 to support the ends of the main shaft 12. A bevel gear 47 meshes with a similar gear 48 on the shaft 49 that carries a pinion 50, meshing with the spur gear 52 on the shaft 53, the shafts 49 and 53 being carried by the cross bars 54 between the legs 43 and 44. The proportions of these gears is such that the cam shaft 14 and the shafts 53 will revolve at the same speed, and each revolution of these shafts constitutes a cycle of this machine. The two sides are similar in every detail.

On the shaft 53 is secured a large mutilated gear 56 having a well known stop flange 57. The gear meshes with the pinion 58 on the shaft 59, which shaft is mounted in a frame 60 on the bed-plate 42 and carries a feed roller 62 and a gear 63. Mounted on a pin 64 carried by the frame 60 is a yoke 65 which supports a shaft 66 that carries a gear 67 meshing with the gear 63, and a feed roller 68, held in contact with the roller 62 by means of a spring 69 on a bolt 70 extending up from the frame 60, a nut 72 controlling the tension of the spring, and thus the pressure of the feed rollers on the rods A and B.

On the vertical plate 73 forming part of the frame 60 are a series of pins 74 carrying the well known horizontal straightening rollers 75, while the vertical rollers 76 are mounted on the pins 77 carried by the horizontal plate 78. The rider 79 of usual construction engages the stop flange 57 on the mutilated gear 56 and thus prevents the shaft 59 and the feed rollers from turning excepting during the time that the teeth of the gears are in mesh.

The circumference of the feed rollers must be an exact multiple of the length of the rods 4 and 5. The time of rest of the feed rollers is short, preferably about one-sixth of the cycle, or little more than that required to notch and shear the rods. The action of the straightening rollers is so well known that description is unnecessary.

*Notching and shearing means.*—Referring to Figs. 13 and 14, it will be noticed that this fabric is characterized by the notches cut into the constituent rods so as to receive those rods which extend at an angle thereto, and as both sets of the rods are thus notched, the web need be no thicker than a single rod. The rods can be cut to the desired length at the same time that the notching occurs, and the length of the notching device is such that a sufficient number of cutters may be mounted thereon to properly notch an entire rod.

The notching is performed while each rod is positioned between the two halves 80 and 81 of a block secured to the bed-plate 42, in any desired manner, screws 82 being preferred. These parts 80 and 81 are formed with longitudinal grooves 83 and 84 respectively, as shown in Figs. 9, 10 and 11, through which the rod may be fed, and with transverse grooves 85 and 86, in which the cutters 87 and 88 are slidable. These cutters and the transverse grooves are preferably rectangular in cross section, the cutters having shanks 90, mounted in the reciprocating head 91 which is in the form of a bar, T-shaped in cross section. The walls of the longitudinal grooves 83 and 84 are formed to meet at a sharp angle opposite the side adjacent the cutter head so that the rod A will be held from turning while the transverse notches are being cut.

The cutter head carries pins 92 to which the toggle links 93 are connected. The ends of the head are slidable below the guide plates 94. Brackets 95 on the bed-plate 42 carry pins 96 which pass through other links 97. A longitudinally movable bar 98 connects to the links 93 and 97 by means of pins 99, so that upon being moved longitudinally, the bar will cause the cutter head to be moved laterally and thereby move the cutters back and forth in the grooves 85 and 86.

The mechanism for actuating the cutters consists in a link 101 that connects to a pin 102 carried by the bar 98 and to the pin 103 carried by the upper end of the lever 104. This lever is shown in Fig. 3 as mounted on a shaft 105 extending across through the bed-plate 42. At its lower end is a pin 106 that extends into a cam-groove 107 in the side of the gear 56. The shape of this cam-groove and its location with reference to the stop-flange 57 is such that the cutters will be actuated during the period of rest of the feed rollers.

To the end of the cutter head 91 opposite the feeding mechanism, is secured a shear member 109, which co-acts with the stationary shear member 110, shown in Fig. 4, to cut off the previously notched length of the rod A.

*Spreading and positioning mechanism.*— Mounted on the lower side of the bed 42 is a bearing 112 for the shaft 113 that has a crank 114 at one end, which carries a pin 115 and roller 116 that extends between the cams 117 and 118 secured to the shaft 53 as shown in Fig. 9. The cams have inclines 119 and 120, separated by dwells 122 so that the operative movement of the shaft 113 will be intermittent. The cam 117 is preferably integral with the gear 56. See Fig. 20.

Substantially below the guide 94 adjacent the frame 8 is a pair of legs 45, which legs carry a cross bar 124 which furnishes a bearing for the inner end of the shaft 113, as shown in Figs. 15 to 19 inclusive. On the end of this shaft is mounted a crank 125 carrying the pin 126 on which are mounted the connecting rods 127 and 128. Lugs 129, 130, 131 and 132 on the bed 42 carry pins 134 and 135 on which the yokes 136 and 137 are mounted. The ends of these yokes next the central line of the machine need not be considered.

The yoke 136 carries a pin 138 that engages the connecting rod 127, while the arm 139 on the yoke 137 carries a pin 140 that engages the connecting rod 128. If now the crank 125 is swung up in Figs. 15 and 16, the yokes 136 and 137 are caused to move toward each other. The yoke 137 is provided with downwardly extending teeth 142 which are preferably in two parallel rows to form complete guides for the incoming rods and are notched, as shown in Fig. 19, to better engage alternate rods 5 already forming a part of the fabric. These teeth 142 alternate with upwardly projecting notched teeth 143 on the lower yoke 136, which teeth push up those rods 5 which are not pushed down.

The movement of the cam under the force of the inclines 140 on the cams 117 and 118 is so timed that this separation of the rods 5 occurs just before the feeding movement of the rod A begins, and the yokes are separated at the instant the movement of the rod A ceases. As soon as the rod A has stopped moving longitudinally, the notching and shearing mechanism operates to sever the newly introduced rod, and immediately thereafter, the feeding mechanism for the finished netting shown in Figs. 6, 7 and 8 moves the entire fabric, including the newly introduced rod, a distance equal to the diagonal length of a mesh. This carries the rod A from the position *a* in Fig. 4 to the position *b*. At this time however, the rods A and B are not yet in engagement in the notches in the previously positioned rods 4 and 5. To move these rods A and B to such position, that is, the position *c* in Figs. 4 and 16, the following mechanism is provided. See Figs. 15 to 18.

Extending from the cross bar 124, Fig. 18, is a hub 147 in which is revoluble the short shaft 148 having the two cranks 149 and 150 secured to one end. The crank 149 carries a pin 152 which engages in the groove 153 in a cam 154 secured to the shaft 113. This groove has an inclined portion 155. The crank 150 carries a shaft 156 on which the rectangular frame 157 is mounted. A crank 158 at the opposite end of this shaft is mounted on a pin 159 carried by the legs 45.

An arm 161 extends down from the yoke 137 and carries a pin 162 to which a link 163 connects. This link also connects to a pin 164 on the rectangular frame 157, and has a slot 165 in which the pin is slidable. Fingers 166 extend up from the frame 157 and a spring 167 normally holds the frame toward the yokes. The proportions of the parts are such that when the yokes are in the positions shown in Fig. 15, and while the rod A is being fed between the rods 5, the frame 157 will be stationary. After the rod has been sheared the cams 117 and 118 will swing the shaft 113 and cause the parts to move from the positions shown in Fig. 15 to the positions shown in dotted lines in Fig. 16, the parts resting just after the yokes 136 and 137 have separated sufficiently to release the rods 5 to permit the feeding device shown in Figs. 6, 7 and 8 to move the netting, carrying the rod A to the position *b* in Fig. 16. Immediately thereafter the shaft is again turned sufficiently to cause the pin 152 to move down the inclined portion 155 of the cam slot, which forces the fingers 166 up back of the rod A. Further movement of the shaft will cause the yokes to separate still more, the arm 161 swinging out the frame 157 and thus carrying the rod A to the position *c* in Fig. 16. At this position the rod will snap into the notches in the rods 5 between which it has been moving.

The periods of the machine are about as follows. During about 300 degrees of the cycle, the two pairs of rollers 67 and 68 are feeding the rods A and B across the frame of the machine, during which time the netting is stationary and the yokes are in the position shown in Fig. 15. During the remaining 60 degrees, all of the other mechanism operates as follows. The real notching and shearing movement requires about ten degrees, although the cam-groove 107 is made somewhat longer in order to obviate the stresses due to too steep inclinations of the cams. During this notching and shearing, the inclines 119 are turning the shaft 113 the first part of its movement to separate the yokes and free the netting. During the next ten degrees, the roller 116 travels on the dwell 122 and the pin 29 in the cam-groove 18 swings the frame 22 forward and moves the finished netting a distance equal to the diagonal length of a mesh, the pin 38 in the cam-groove 19 having just previously lowered the presser bar 31. During the third ten degrees the shaft 113 continues its movement and the pins 166 are elevated to the position shown in Fig. 16. During the last part of the third ten degrees and the first part of the fourth, the presser bar 31 is elevated and grips the netting, and the frame 22 swings back to normal position. During the fourth ten degrees, the frames 157 are moved to carry the rods A and B to proper positions where they enter the notches in the rods 4 and 5 already positioned. During the last twenty degrees, the spreaders and positioning means resume the positions shown in Fig. 15. These periods are merely approximate and may be changed to meet the various requirements.

Many changes in the details of construction may be made without departing from the spirit of my invention set forth in the following claims.

I claim:

1. In a netting loom, the combination of independent means for feeding two continuous rods at an angle to each other, means to cut notches alternately into the top and bottom sides of said rods, means to alternately lift and depress adjacent parallel rods constituting the netting so that the rod being fed in at an angle thereto may pass between them, means to shear said first-mentioned rods, means to move the just severed rods until they rest in the notches of the rods at an angle thereto, and means to move the finished netting.

2. In a netting loom, the combination of means for cutting notches in the top and bottom sides of two metal rods, means to feed the rods across each other's paths and parallel to previously positioned rods, means to push each alternate rod of one set up and the other rods down to permit the insertion of the first-mentioned rod of the other set, means to move the just inserted rods laterally until each lies in the notches of the rods of the other set, and means to move the netting the diagonal length of a mesh.

3. In a netting loom, the combination of a frame to support the finished netting, means to intermittently feed the finished netting along on the frame, means mounted on both sides of the frame to feed metal rods diagonally across the frame and at right angles to each other, reciprocating cutters mounted on each side of the frame to cut notches in the top and bottom sides of the rods, shears for cutting the rods at proper length, means to temporarily lift and depress alternately the rods fed from either side to permit the insertion of a rod from the other side, means to shear the rods, and means to move the last severed rod laterally until it enters the notches on the rods which were lifted and depressed to permit its insertion.

4. In a netting loom, the combination of a frame to support the netting, means to feed the finished netting step by step along the frame, a feeding and straightening device at each side of the frame for projecting metal rods diagonally across the frame and at an angle to each other, reciprocating cutters for simultaneously cutting notches in the upper and lower sides of the rods so spaced as to determine the mesh of the netting, means for lifting and depressing alternate rods of each set to permit the introduction of a rod of the other set, means to sever the rods thus introduced, and means to move each of said newly severed rods into proper location in the notches in the rods of the other set.

5. In a netting loom, the combination of a frame, independent means for feeding two continuous rods at an angle to each other across the frame, a reciprocating device and a series of cutters mounted thereon to cut a series of notches alternately across the top and bottom sides of each of the rods and a shear mounted on each of said devices to sever the rods, means to lift and depress the parallel rods already in place so that the rods being fed in at an angle thereto may pass between them, means to move the netting step by step, and means to move the just severed rods laterally until they rest in the notches of the already positioned rods which are at an angle thereto.

6. In a netting loom, the combination of a frame, independent means for feeding two continuous rods at an angle to each other across the frame, means to cut notches alternately into the top and bottom sides of the rods, a pair of pivoted jaws mounted on each side of the frame and having teeth so that they can lift and depress alternate rods already in place so that the first mentioned rods being fed in at an angle thereto may pass between them, means to shear said first mentioned rods, means to move the fabric step by step, and means to slide the last inserted rods between the already positioned rods at an angle to each of them until the first mentioned rods rest in the notches in the said already positioned rods.

7. In a netting loom, the combination of a frame, independent means for feeding two notched rods so that they intersect at substantially right angles, means to shear the rods so that they extend at substantially the same distance from their point of intersection, and means to move said rods laterally into engagement in the notches in previously positioned rods.

8. In a netting loom, the combination of independent means for feeding two notched rods so that they intersect at substantially right angles, means to shear the rods so that they extend at substantially the same distance from their point of intersection, a pair of vertically movable jaws provided with notched teeth to elevate and depress previously positioned rods to permit the insertion of the first named rods, means to move the jaws out of engagement, and means to feed the netting the diagonal length of a mesh.

9. In a netting loom, the combination of independent means for feeding two notched rods so that they intersect at substantially right angles, means to shear the rods so that they extend at substantially the same distance from their point of intersection, a pair of vertically movable jaws provided with notched teeth to elevate and depress previously positioned rods to permit the insertion of the first named rods, means to move the jaws out of engagement, means to feed the netting the diagonal length of a mesh, and means for gripping the netting to prevent movement.

10. In a netting loom, the combination with a supporting frame for the netting, feeding and gripping devices for the netting mounted on said frame, a pair of bed plates connected to said frame and extending at oblique angles thereto and at right angles to each other, a pair of jaws mounted on each bed plate to elevate and depress alternate rods already constituting a part of the netting, means to notch the continuous rods, means to feed the same between said jaws and the rods already positioned, and means to shear the rods.

11. In a netting loom, the combination of a bed plate, a block secured thereto having a longitudinal hole whose sides meet at an angle substantially midway of the height of the hole and also having transverse guide openings substantially rectangular in cross section, extending alternately above and below the meeting line of said sides, a series of rectangular cutters movable in said transverse openings, a bar on which said cutters are mounted, a shear connected to said bar, means for feeding a rod through said block, and means for weaving said rod into a fabric.

12. In a netting loom, the combination of a frame, independent means for feeding two notched rods diagonally across the frame from opposite sides so that they cross each other, means to cut off the rods so that they extend at substantially the same distance from the crossing point, a pair of vertically movable coöperating yokes for each of said rods and each yoke having two parallel rows of teeth which alternate in said yokes of each pair to elevate and depress alternate rods which have been previously positioned to constitute the netting, said rows of teeth constituting guiding means for the first-mentioned rods.

13. In a netting loom, the combination of a frame, independent means for notching each of two continuous rods, independent means for feeding longitudinally each of the notched rods diagonally across the frame from opposite sides so that they cross each other at right angles, independent shearing means for each of the rods and operating to cut off the rods so that they extend at substantially the same distance from the crossing point, a pair of vertically movable yokes for each of said rods adapted to elevate and depress alternate rods which have been previously finally positioned to constitute the netting, and means to feed the finished netting step by step.

14. In a netting loom, the combination of a frame, independent means for notching each of two continuous rods, independent means for feeding longitudinally each of the notched rods diagonally across the frame from opposite sides so that they cross each other at right angles, independent shearing means for each of the rods and operating to cut off the rods so that they extend at substantially the same distance from the crossing point, and a pair of vertically movable yokes for each of said rods and each yoke having two parallel rows of teeth alternating in said yokes of each pair to elevate and depress alternate rods which have been previously positioned to constitute the netting, said rows of teeth constituting guiding means for the rods being fed in.

15. In a netting loom, the combination of a frame, independent means for notching each of two continuous rods, independent means for feeding longitudinally each of the notched rods diagonally across the frame from opposite sides so that they cross each other at right angles, independent shearing means for each of the rods and operating to cut off the rods so that they extend at substantially the same distance from the crossing point, and a pair of vertically movable yokes for each of said rods and each yoke having two parallel rows of teeth alternating in said yokes of each pair to elevate and depress alternate rods which have been previously positioned to constitute the netting, said rows of teeth constituting guiding means for the rods being fed in, the teeth of said yokes being transversely notched to prevent lateral movement of the previously positioned rods.

16. In a netting loom, the combination of a supporting frame for the netting, feeding devices for the finished netting, a pair of rod feeding devices mounted adjacent said frame and the finished netting and adapted to feed rods at an oblique angle to the line of feed of the finished netting and at an angle to each other, and two sets of cutters mounted adjacent each rod feeding device, one set adapted to notch a rod throughout its full length on its upper side and the other set to simultaneously notch the lower side, and operating means for the cutters.

17. In a netting loom, the combination of a supporting frame for the netting, a rod feeding device mounted adjacent said frame and adapted to feed rods diagonally across the line of feed of the netting, a hollow die through which the rods are fed, a reciprocating bar, two sets of punches mounted on said bar, the punches of one set adapted to cut notches in the tops of said rods and the punches of the other set adapted to cut notches in the bottoms of said rods and alternating with the punches of the first set, and means to actuate said bar.

18. In a netting loom, the combination of means for notching rods alternately on opposite sides, means for feeding two notched rods diagonally of the finished netting from opposite sides thereof so that said rods will cross at substantially the middle of the netting, and means for raising and depressing alternate rods already constituting the netting and extending transversely to the rod being fed in between them.

19. In a netting loom, the combination of means for notching rods alternately on opposite sides, means for feeding two notched rods diagonally of the finished netting from opposite sides thereof so that said rods will cross at substantially the middle of the netting, means for raising and depressing alternate rods already constituting the netting and extending transversely to the rod being fed in between them, and means for moving the finished fabric the diagonal length of a mesh to permit the introduction of two more rods.

20. In a netting loom, the combination of means for notching rods alternately on opposite sides, means for feeding two notched rods diagonally of the finished netting from opposite sides so that they cross at substantially the middle of the netting, means for simultaneously raising and depressing alternate rods already constituting the netting and which are respectively transverse to the rod being fed in between them, means for moving the finished netting the diagonal length of a mesh to permit the introduction of two more notched rods, and means to move the just previously introduced rods laterally until they enter notches in the rods that were thus raised and depressed, said rods just raised and depressed entering the notches in the last positioned rods.

In testimony whereof I have signed this specification.

BERNT GARLLUS.